(12) United States Patent
Faucher et al.

(10) Patent No.: US 8,211,604 B2
(45) Date of Patent: Jul. 3, 2012

(54) SELF EMULSIFYING GRANULES AND SOLVENT FREE PROCESS FOR THE PREPARATION OF EMULSIONS THEREFROM

(75) Inventors: Santiago Faucher, Oakville (CA); Rina Carlini, Oakville (CA); Joo T. Chung, Webster, NY (US); Fumii Higuchi, Mississauga (CA); Shigang Qiu, Toronto (CA); Allan K. Chen, Oakville (CA); Edward Graham Zwartz, Mississauga (CA); Michael Steven Hawkins, Cambridge (CA); Brian J. Andaya, Ontario, NY (US); Joseph L. Leonardo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 557 days.

(21) Appl. No.: 12/485,415

(22) Filed: Jun. 16, 2009

(65) Prior Publication Data
US 2010/0316946 A1     Dec. 16, 2010

(51) Int. Cl.
*G03G 9/087*     (2006.01)
(52) U.S. Cl. ............. 430/108.1; 430/108.2; 430/108.23; 430/109.4
(58) Field of Classification Search ............... 430/109.4, 430/108.1, 108.2, 108.23
See application file for complete search history.

(56) References Cited

U.S. PATENT DOCUMENTS

| | | | |
|---|---|---|---|
| 3,933,954 A | 1/1976 | Gebhard et al. | |
| 4,056,653 A | 11/1977 | Gebhard et al. | |
| 5,278,020 A | 1/1994 | Grushkin et al. | |
| 5,290,654 A | 3/1994 | Sacripante et al. | |
| 5,302,486 A | 4/1994 | Patel et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,354,804 A | 10/1994 | Inada et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,399,597 A | 3/1995 | Mandel et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,496,676 A | 3/1996 | Croucher et al. | |

(Continued)

FOREIGN PATENT DOCUMENTS
WO     WO 98/45356     10/1998
(Continued)

OTHER PUBLICATIONS
U.S. Appl. No. 12/032,173, filed Feb. 15, 2008.
(Continued)

*Primary Examiner* — Hoa V Le
(74) *Attorney, Agent, or Firm* — Judith L. Byorick

(57) ABSTRACT

A process for making a self-emulsifying composite suitable for use in forming latex emulsions includes contacting a resin with a solid or highly concentrated surfactant, a solid neutralizing agent in the absence of water and an organic solvent to form a mixture, melt mixing the mixture, and forming a self-emulsifying composite of the melt mixed mixture such as a granule. Self-emulsifying granules are also provided and configured to form a latex emulsion when added to water, which may then be utilized to form a toner.

20 Claims, 5 Drawing Sheets

U.S. PATENT DOCUMENTS

| | | |
|---|---|---|
| 5,501,935 A | 3/1996 | Patel et al. |
| 5,527,658 A | 6/1996 | Hopper et al. |
| 5,548,004 A | 8/1996 | Mandel et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,943 A | 12/1998 | Cheng et al. |
| 5,853,944 A | 12/1998 | Foucher et al. |
| 5,863,698 A | 1/1999 | Patel et al. |
| 5,869,215 A | 2/1999 | Ong et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,080,807 A | 6/2000 | Campbell |
| 6,512,024 B1 | 1/2003 | Lundgard et al. |
| 7,064,156 B2 | 6/2006 | Rink et al. |
| 7,385,001 B2 | 6/2008 | Shim et al. |
| 2002/0074681 A1 | 6/2002 | Lundgard et al. |
| 2008/0107989 A1 | 5/2008 | Sacripante et al. |
| 2008/0153027 A1 | 6/2008 | Veregin et al. |
| 2009/0130589 A1* | 5/2009 | Udo et al. ............ 430/137.11 |

FOREIGN PATENT DOCUMENTS

WO    WO 00/17256    3/2000

OTHER PUBLICATIONS

U.S. Appl. No. 12/056,529, filed Mar. 27, 2008.

* cited by examiner

US 8,211,604 B2

SELF EMULSIFYING GRANULES AND SOLVENT FREE PROCESS FOR THE PREPARATION OF EMULSIONS THEREFROM

TECHNICAL FIELD

The present disclosure relates to the use of organic bases to emulsify polyester resins using a solvent free extruder process to produce latex emulsions useful in the preparation of toners, and solvent free processes for the preparation of same.

BACKGROUND

Numerous processes are within the purview of those skilled in the art for the preparation of toners. Emulsion aggregation (EA) is one such method. Emulsion aggregation toners may be used in forming print and/or xerographic images. Emulsion aggregation techniques may involve the formation of an emulsion latex of the resin particles, by heating the monomers, using a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,902,710; 5,910,387; 5,916,725; 5,919,595; 5,925,488, 5,977,210, 5,994,020, and U.S. Patent Application Publication No. 2008/0107989, the disclosures of each of which are hereby incorporated by reference in their entirety.

Polyester toners exhibiting low melt properties have been prepared utilizing amorphous and crystalline polyester resins as illustrated, for example, in U.S. Patent Application Publication No. 2008/0153027, the disclosure of which is hereby incorporated by reference in its entirety.

Polyester toners have been prepared using polyester resins to achieve low melt behavior, enabling faster print speeds and lower energy consumption. However, the incorporation of these polyesters into the toner requires that they first be formulated into latex emulsions prepared by solvent containing processes, for example solvent flash emulsification and/or solvent-based phase inversion emulsification. In both cases, large amounts of organic solvents, such as ketones or alcohols, have been used to dissolve the resins, which may require subsequent energy intensive distillation to form the latexes, and are not environmentally friendly.

Solventless latex emulsions have been formed in either a batch or extrusion process through the addition of a neutralizing solution, a surfactant solution and water to a thermally softened resin as illustrated, for example, in U.S. patent application Ser. Nos. 12/032,173 and 12/056,529, the disclosures of each of which are hereby incorporated by reference in their entirety. Solventless self emulsifying granules have also been formed by melt mixing a mixture of a resin, neutralizing agent, surfactant and water as illustrated in, for example, U.S. patent application Ser. No. 12/325,396, the disclosure of which is hereby incorporated by reference in its entirety.

However, the use of water, necessary for dissolving most inorganic and solid neutralizing agents due to their high melting points, poses several operational challenges to the production of latexes and self-emulsifying granules since water injection into an extruder is challenging and may adversely affect final resin properties.

Improved methods for producing toners, which reduce the number of stages and materials, remain desirable. Such processes may reduce production costs for such toners and may be environmentally friendly.

SUMMARY

A process of the present disclosure includes contacting a polyester resin with a highly concentrated surfactant, and a solid neutralizing agent selected from the group consisting of monocyclic compounds containing one or more nitrogen atoms, polycyclic compounds containing one or more nitrogen atoms, and combinations thereof, in the absence of water and an organic solvent to form a mixture; melt mixing the mixture; forming a self-emulsifying composite of the melt mixed mixture; solidifying the composite and forming it into a granule.

A process for preparing a polyester toner is provided which includes contacting a crystalline polyester resin with a highly concentrated surfactant, and a solid neutralizing agent selected from the group consisting of monocyclic compounds containing one or more nitrogen atoms, polycyclic compounds containing one or more nitrogen atoms, and combinations thereof, in the absence of water and an organic solvent to form a mixture; melt mixing the mixture; forming a self-emulsifying composite of the melt mixed mixture; solidifying the self-emulsifying composite and forming it into a granule; adding water to the composite, such as the self-emulsifying granules, when desired to form a latex emulsion; and optionally adding one or more additional ingredients of a toner composition to the resin.

A self-emulsifiable granule of the present disclosure includes at least one polyester resin in the absence of an organic solvent and water; a highly concentrated surfactant; and a solid neutralizing agent selected from the group consisting of monocyclic compounds containing one or more nitrogen atoms, polycyclic compounds containing one or more nitrogen atoms, and combinations thereof; and wherein the self-emulsifiable granule forms a latex emulsion upon contact with water.

BRIEF DESCRIPTION OF DRAWINGS

Various embodiments of the present disclosure will be described herein below with reference to the figures wherein.

DETAILED DESCRIPTION

Figure 1:
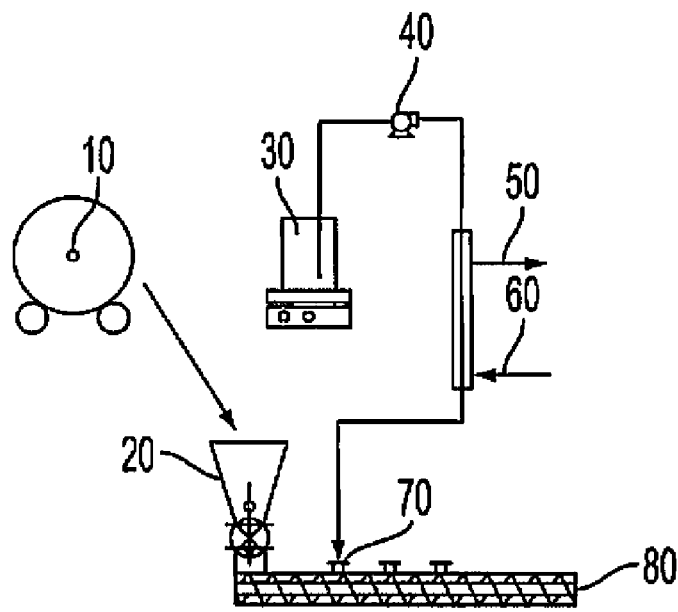
FIG. 1 is a flow chart depicting an extruder process for the preparation of granules in accordance with prior art.

The present disclosure provides processes for forming self-emulsifying granules of resins in the absence of water as a solvent. These resin granules, in turn, may then be utilized to form a latex emulsion containing latex particles which may be utilized to make toners. Alternatively prior to solidification and granulation, the extruder extrudate may be added to water to form a latex directly without passing through the granulation step. In embodiments, a process of the present disclosure includes contacting a resin with a surfactant, and a solid neutralizing agent in the absence of an organic solvent, and in the absence of water, to form a mixture; melt mixing the mixture; forming a self-emulsifying composite; and forming self-emulsifying granules of the self-emulsifying composite. The self-emulsifying granules may have a diameter of from about 0.5 cm to about 2 cm, in embodiments of from about 0.8 cm to about 1.2 cm, although values outside these ranges may be obtained.

The present disclosure also provides processes for producing a latex emulsion from the self-emulsifying composite or granules to form a toner. In embodiments, a process for preparing an emulsion of the present disclosure includes contacting a crystalline resin with a surfactant and a solid neutralizing agent in the absence of an organic solvent, and in the absence of water to form a mixture; melt mixing the mixture; forming self-emulsifying granules of the melt mixed mixture; adding water to the self-emulsifying granules when desired to provide a latex emulsion; and optionally one or more additional ingredients of a toner composition is added, such as a colorant, wax, and other additives to the above mixture to form a toner.

The present disclosure also provides a self emulsifying granule having at least one polyester resin in the absence of both an organic solvent and water; a solid or highly concentrated surfactant; and a solid neutralizing agent; wherein the self-emulsifying granule forms a latex emulsion upon contact with water.

As used herein, "the absence of an organic solvent and water" includes, in embodiments, for example, that neither organic solvents nor water are used to dissolve the resin or neutralizing agent for emulsification. However, it is understood that minor amounts of such solvents may be present in such resins as a consequence of their use in the process of forming the resin.

As used herein, a "highly concentrated surfactant" includes, in embodiments, for example, a surfactant having a high solids concentration of from about 40% to about 100%, in embodiments from about 46% to about 100%. However, it is understood that a lower concentration of such solids may be present in surfactants used in accordance with the present disclosure.

Resins

Any resin may be utilized in forming a self emulsifiable composite of the present disclosure. In embodiments, the resins may be an amorphous resin, a crystalline resin, and/or a combination thereof In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 50 percent by weight of the toner components, in embodiments from about 10 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly (propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

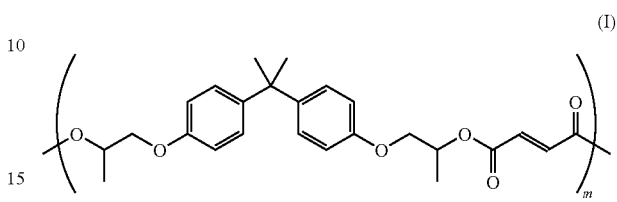

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

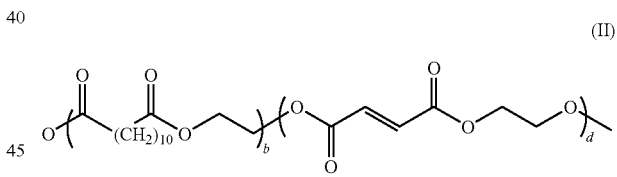

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

The amorphous resin may be present, for example, in an amount of from about 30 to about 90 percent by weight of the toner components, in embodiments from about 40 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin), Where the resin includes an amorphous resin and a crystalline resin, the weight ratio of the two resins may be from about 99% (amorphous resin):1% (crystalline resin), to about 1% (amorphous resin):90% (crystalline resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Neutralizing Agent

Once obtained, the resin may be melt-mixed at an elevated temperature, with a weak base or neutralizing agent added thereto. In embodiments, the base may be a solid.

In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include monocyclic compounds and polycyclic compounds, having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

The basic agent may be utilized so that it is present in an amount of from about 0.001% by weight to 50% by weight of the resin, in embodiments from about 0.01% by weight to about 25% by weight of the resin, in embodiments from about 0.1% by weight to 5% by weight of the resin, although amounts outside these ranges may be used.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11, although values outside these ranges may be obtained. The neutralization of the acid groups may, in embodiments, enhance formation of the emulsion. Acid-base reactivity with a neutralizing agent of the present disclosure is schematically shown herein below:

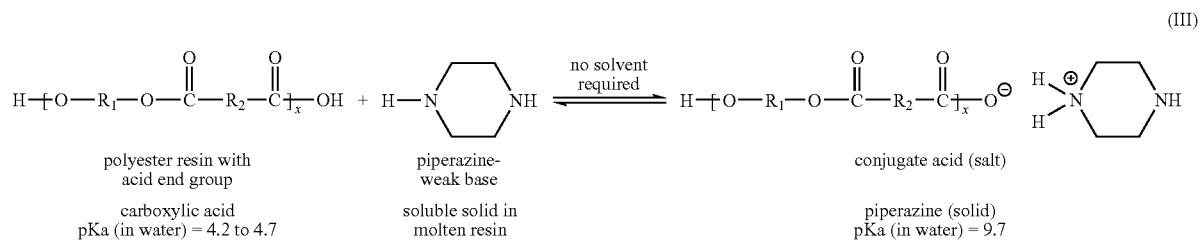

(III)

Unlike bases such as sodium hydroxide, secondary amines, such as, for example, piperazine, are miscible in the polyester resin, have a melting point of about 106° C., and can therefore act as a neutralizing agent directly in the melted resin without the need for water. Furthermore, in embodiments, as piperazine is a solid at room temperature, it can be easily pre-blended with the resin to form part of the extruder dry feed.

The properties of these secondary amines, such as piperazine, greatly simplify the solvent-free emulsification process as it eliminates the need for pumping fluids into the extruder, e.g. water. The pumping of fluids into extruders poses several challenges that in practice can not be completely resolved, leading to a product that is often out of the desired specification range. Sintering of feed material in the extruder feed hopper (on account of water injection and subsequent steam formation), poor ratio control of water/dry feed, plugged injection nozzles, and faulty pumps are but a few of the failure modes encountered during the production of latexes using bases necessitating the use of water. Bases such as sodium hydroxide can also lead to differences in reaction conditions that produce materials that are out of the desired specification range (particle size, particle size distribution, resin degradation).

Acid base reactivity of NaOH is schematically shown herein below:

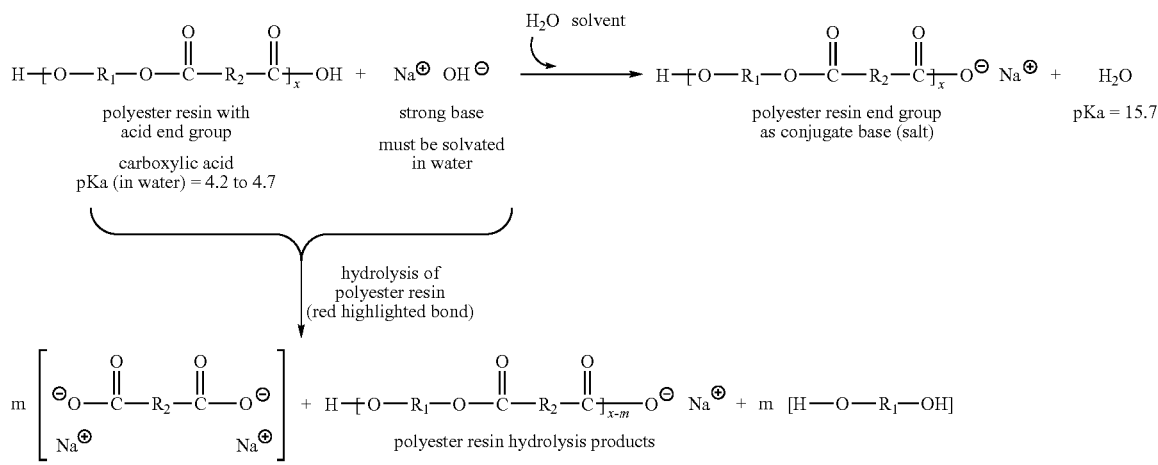

(IV)

The substitution of NaOH by piperazine and other secondary amines may eliminate these processing failure modes without affecting toner performance.

In addition, the use of neutralizing agents of the present disclosure may reduce or eliminate polyester degradation (hydrolysis) observed in the production of the latex. NaOH has a $pK_a$ of 15.7 (in water) while piperazine has a $pK_a$ of 9.7 (in water), thereby making NaOH a much stronger base than piperazine and a strong nucleophile that can easily hydrolyze ester bonds in polyester resins, which in turn, degrades the polyester resin. Since the $pK_a$ values of carboxylic acids range from 4.7 (i.e. alkane carboxylic acids) to 4.2 (i.e. benzoic acid), a more suitable base, which approaches the strength of the acid with which it will react under controllable conditions, is the milder, non-nucleophilic secondary amine base.

The secondary amines of the present disclosure are also more easily and safely handled compared to other liquid amine alternatives (such as piperidine, morpholine, and/or triethylamine) which may pose a spill and corrosion hazard. Furthermore, the solid secondary amines are not odorous nor as toxic as piperidine or morpholine; they are easily detectable by NMR spectroscopy and their product quality is easily determined due to the symmetry of their chemical structure.

Surfactants

In embodiments, the process of the present disclosure may include adding a surfactant, before or during the melt mixing, to the resin at an elevated temperature. In embodiments, the surfactant may be added prior to melt-mixing the resin at an elevated temperature. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a highly concentrated solution with a concentration of from about 40% to about 100% (pure surfactant) by weight, in embodiments, from about 45% to about 95% by weight, although amounts outside these ranges may be used. In embodiments, the surfactant may be utilized so that it is present in an amount of from about 0.01% to about 20% by weight of the resin, in embodiments, from about 0.1% to about 12% by weight of the resin, in other embodiments, from about 1% to about 10% by weight of the resin, although amounts outside these ranges may be used.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

As noted above, the present process includes melt mixing at an elevated temperature a mixture containing a resin, a solid or highly concentrated surfactant and a solid neutralizing agent, wherein an organic solvent and water are not utilized in the process, to form self-emulsifying composites such as granules. More than one resin may be utilized in forming the granules. As noted above, the resin may be an amorphous resin, a crystalline resin, or a combination thereof. In embodiments, the resin may be an amorphous resin and the elevated temperature may be a temperature above the glass transition temperature of the resin. In other embodiments, the resin may be a crystalline resin and the elevated temperature may be a temperature above the melting point of the resin. In further embodiments, the resin may be a mixture of amorphous and crystalline resins and the temperature may be above the glass transition temperature of the mixture.

Thus, in embodiments, a process of the present disclosure may include melt mixing a polyester resin for a short period of time with a solid neutralizing agent, and a highly concentrated or solid surfactant in the absence of water and an organic solvent. As noted above, suitable neutralizing agents include secondary amines such as aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

Using these secondary amines allows the extruder to operate at higher temperatures, which may result in increased process throughputs. Since water is absent from the process, the operating temperature is not limited to the boiling point of water. The higher temperatures that may thus be used may result in lower resin viscosities and lower die pressure drops, permitting higher production rates.

In embodiments, the surfactant may be added to the one or more ingredients of the resin composition before, during, or after melt-mixing. In embodiments, the surfactant may be added before, during, or after the addition of the neutralizing agent. In embodiments, the surfactant may be added prior to the addition of the neutralizing agent.

In the above-mentioned heating, the elevated temperature may be from about 30° C. to about 300° C., in embodiments from about 50° C. to about 200° C., in other embodiments from about 70° C. to about 150° C., although temperatures outside these ranges may be used.

Melt mixing may be conducted in an extruder, i.e. a twin screw extruder, a kneader such as a Haake mixer, a batch reactor, or any other device capable of intimately mixing viscous materials to create near homogenous mixtures.

Stirring, although not necessary, may be utilized to enhance formation of the self-emulsifying granules. Any suitable stirring device may be utilized. In embodiments, the stirring may be at from about 10 revolutions per minute (rpm) to about 5,000 rpm, in embodiments from about 20 rpm to about 2,000 rpm, in other embodiments from about 50 rpm to about 1,000 rpm, although speeds outside these ranges may be used. The stirring need not be at a constant speed, but may be varied. For example, as the heating of the mixture becomes more uniform, the stirring rate may be increased.

The self emulsifying composite exiting the melt mixer may be cooled to room temperature, whereby it may form a solid material that may be easily crushed, cut or pelletized into granules. In embodiments, the solid material may be pelletized into granules having an average diameter of from about 0.1 cm to about 2 cm, in embodiments, from about 0.5 cm to about 1.5 cm, in other embodiments, from about 0.8 cm to about 1.2 cm, although sizes outside these ranges may be utilized.

The self emulsifying granules may be shipped and stored for prolonged periods of time without affecting the material properties of the resin. In embodiments, the granules may be stored for periods of from about 1 day to about 50 days, in other embodiments, of from about 2 days to 45 days, although time periods outside these ranges may be obtained.

The self-emulsifiable granules of the present disclosure offer many of the following advantages over the prior art including, for example, low coarse content, tight particle size distributions and particle sizes appropriate for emulsion aggregation toner manufacturing; no homogenizers or other dispersing devices required for the preparation of latexes; no filtration to eliminate coarse particles; latex production on demand from a convenient solid material; long term stability against biological degradation; reduced shipping and warehousing costs; and lower carbon footprint.

The granules of the present disclosure may then be utilized to produce particle sizes that are suitable for emulsion aggregation ultra low melt processes, using crystalline and/or amorphous polyester resins. The granules may produce latexes with a low coarse content without the use of homogenization or filtration. Preparation of self emulsifying granules may reduce the carbon footprint simply by reducing the volume of material to be shipped between production and consumption facilities, thereby reducing latex shipping charges.

Emulsion Formation

Once the self-emulsifying granules of the present disclosure are obtained, the granular material may then be added to water when convenient or desired, to form a latex emulsion. Water may be added in order to form a latex with solids content of from about 5% to about 50%, in embodiments, of from about 10% to about 35%. While higher water temperatures may accelerate the dissolution process, latexes can be formed at temperatures as low as room temperature. In other embodiments, water temperatures may be from about 40° C. to about 110° C., in embodiments, from about 50° C. to about 100° C., although temperatures outside these ranges may be used.

Contact between the water and granules may be achieved in any suitable manner, such as in a vessel or continuous conduit, in a packed bed. In a batch process, the granules may be added to a hot water bath with low agitation and left to form the latex. In other embodiments, the granules may be held by a sieving device and water may flow through a filter cake of the granules or, alternatively, in embodiments, over a bed of granules until they dissolve into a latex form.

The particle size of the latex emulsion formed can be controlled by the concentration ratio of surfactant and neutralizing agent to polyester resin. The solids concentration of the latex may be controlled by the ratio of the granular material to the water.

In accordance with the present disclosure, it has been found that the processes herein may produce emulsified resin particles that retain the same molecular weight properties of the starting resin, in embodiments, the self-emulsifying bulk or pre-made resins utilized in forming the emulsion.

The emulsified resin particles in the aqueous medium may have a size of about 1500 nm or less, such as from about 10 nm to about 1200 nm, in embodiments from about 30 nm to about 1000 nm.

Following emulsification, additional surfactant, water, and/or neutralizing agent may optionally be added to dilute the emulsion, although this is not required. Following emulsification, the emulsion may be cooled to room temperature, for example from about 20° C. to about 25° C.

Toner

Once the self-emulsifying granules have been contacted with water to form an emulsion as described above, the resulting latex may then be utilized to form a toner by any method within the purview of those skilled in the art. The latex emulsion may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorant, wax, and other additives, may be added before, during or after melt mixing the resin to form the self-emulsifying granules. The additional ingredients may be added before, during or after formation of the latex emulsion, wherein the self-emulsifying granule is contacted with water. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850: 1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and the like, and mixtures thereof.

Other suitable aggregating agents also include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture, although the amount of aggregating agent can be outside of these ranges. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Shell Resin

In embodiments, after aggregation, but prior to coalescence, a resin coating may be applied to the aggregated particles to form a shell thereover. Any resin described above as suitable for forming the core resin may be utilized as the shell. In embodiments, a polyester amorphous resin latex as described above may be included in the shell. In yet other embodiments, the polyester amorphous resin latex described above may be combined with a resin that may be utilized to form the core, and then added to the particles as a resin coating to form a shell.

In embodiments, resins which may be utilized to form a shell include, but are not limited to, a crystalline resin latex described above, and/or the amorphous resins described above for use as the core. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins, optionally the solvent free crystalline polyester resin latex neutralized with piperazine described above, may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

Coalescence

Following aggregation to the desired particle size and application of any optional shell, the particles may then be coalesced to the desired final shape, the coalescence being achieved by, for example, heating the mixture to a temperature of from about 45° C. to about 100° C., in embodiments from about 55° C. to about 99° C., which may be at or above the glass transition temperature of the resins utilized to form the toner particles, and/or reducing the stirring, for example to from about 100 rpm to about 1,000 rpm, in embodiments from about 200 rpm to about 800 rpm. Higher or lower temperatures may be used, it being understood that the temperature is a function of the resins used for the binder. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Comparative Example 1

Preparation of self-emulsifiable granules based on a crystalline polyester resin with sodium hydroxide as a neutralizing agent in an extruder and their subsequent emulsification in a batch process. An extruder, as depicted in FIG. 1, was equipped with a feed hopper and liquid injection ports was preheated to about 95° C. and set to a rotor speed of about 450 rpm. About 1120 grams of sodium dodecylbenzene sulfonate (SDBS about 7 wt %), about 160 grams of NaOH and about 16 kilograms of a poly(nonylene-decanoate) crystalline polyester resin was mixed in tumbler 10 to prepare a pre-blend mixture. This preblend mixture was loaded into the hopper of a screw feeder which delivered about 380 g/min of the mixture to the extruder 20 as illustrated in FIG. 1. As the material traveled down the screw feeder and melted, de-ionized water (DIW), from tank 30, was fed to the extruder's first injection port 70 at a feed rate of about 150 ml per minute via a diaphragm pump 40. Prior to entering extruder port 70 the water is heated by a shell and tube heat exchanger via indirect steam entering at port 60 and exiting at port 50. The water activated the NaOH and SDBS so that a homogeneous mixture of neutralized resin was produced at the extruder die which was collected, cooled, and crushed. About 15.2 grams of a sample of the extrudate was removed, cooled and stored in a dry place. Later, the solid extrudate was added to about 160 grams of DIW in a kettle 80 preheated to a temperature of about 95° C. with gentle stirring. The solids content of the emulsion was controlled by the ratio of extrudate to DIW. The latex emulsion was then used in the aggregation/coalescence process.

This process required the addition of water to the extruder and led to the degradation of the resin in the latex. Gel permeation chromotagraphy (GPC) assays indicated that the polymer average molecular weight dropped by 14% in this process (see table 1).

Example 1

Figure 2:
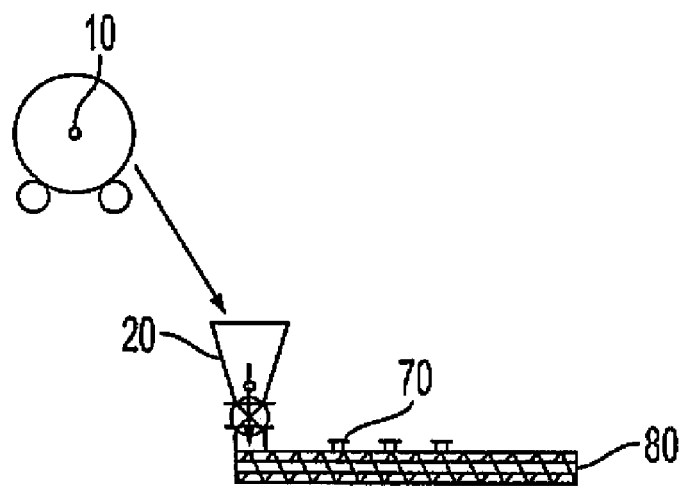
FIG. 2 is a flow chart depicting an extruder process for the preparation of granules in accordance with the present disclosure.

Preparation of self-emulsifiable granules based on a crystalline polyester resin and secondary amine neutralizing agent in an extruder and their subsequent emulsification in a batch process. An extruder, as depicted in FIG. 1, equipped with a feed hopper and liquid injection ports was preheated to about 130° C. and set to a rotor speed of about 450 rpm. About 131 grams of sodium dodecylbenzene sulfonate (SDBS about 7 wt %), about 20 grams of piperazine and about 1.875 kilograms of a poly(nonylene-decanoate) crystalline polyester resin was mixed in tumbler 10 to prepare a pre-blend mixture. This pre-blend mixture was loaded into the hopper of a screw feeder which delivered about 75 g/min of the mixture to the extruder 20, as illustrated in FIG. 2. As the material traveled down the screw feeder, it melted and neutralization of the resin acid end groups by piperazine took place. In this process, the surfactant was also melt mixed into the resin to produce a homogeneous mixture at the extruder die which was collected, cooled, and crushed. Later, the solid extrudate was added to about 160 grams of DIW in a kettle 80 preheated to a temperature of about 95° C. with gentle stirring. The solids content of the emulsion was controlled by the ratio of extrudate to DIW. The latex emulsion was then used in the aggregation/coalescence process (see Example 3).

This process did not require the addition of water to the extruder and did not affect the resin molecular weight in the latex (despite the longer residence time). GPC assays indicated that the polymer average molecular weight of the starting and processed materials were the same (see table 1).

Comparative Example 2

Preparation of self-emulsifiable granules based on an amorphous polyester resin and sodium hydroxide as the neutralizing agent in a Haake mixer and subsequent emulsification in a batch process. A Haake melt mixer equipped with counter-rotating rotors was preheated to about 95° C. and then set to a rotor speed of about 100 rpm. About 50 grams of a poly(co-propoxylated bisphenol co-ethoxylated bisphenol co-terephtalate) polyester amorphous resin was loaded into the Haake mixer and melted. To this material, about 4 grams of sodium dodecylbenzene sulfonate (5 wt %), and about 1.27 grams of NaOH was added to the cavity of the mixer and the material was melt mixed for about 15 minutes. About 11.4 grams of water was added to the mixer cavity over about 10 minutes and then was left to melt mix with the resin for an additional 10 minutes. The product was collected from the Haake mixer cavity and solidified upon cooling. The solid material was crushed by hand into granules approximately 1 cm in diameter. The granules were added to about 400 grams of de-ionized water having a temperature of about 95° C. while stirring to form a latex.

GPC assays of the processed resin showed a 48% drop in resin molecular weight following this process (see Table 1).

Example 2

Preparation of self-emulsifiable granules based on an amorphous polyester resin and a secondary amine neutralizing agent in a Haake mixer and subsequent emulsification in a batch process. A Haake melt mixer equipped with counter-rotating rotors was preheated to about 130° C. and then set to a rotor speed of about 100 rpm. About 50 grams of a poly(co-propoxylated bisphenol co-ethoxylated bisphenol co-terephtalate) polyester amorphous resin was loaded into the Haake mixer and melted. To this material, about 4 grams of sodium dodecylbenzene sulfonate (5 wt %), and about 1.36 grams of piperazine was added to the cavity of the mixer and the material was melt mixed for about 15 minutes. The product was collected from the Haake mixer cavity and solidified upon cooling. The solid material was crushed by hand into granules approximately 1 cm in diameter. The granules were added to about 400 grams of de-ionized water having a temperature of about 95° C. while stirring to form a latex.

GPC assays of the processed resin showed an 18% drop in resin molecular weight following this process, which was significantly less than the 48% drop observed with NaOH in lieu of piperazine (Comparative Example 2).

Table 1 herein below compares the molecular weights of the resins in the granules over time and following emulsification. As illustrated, resin molecular weights remained unchanged with time in the granular material. In Example 3, granules produced from the extruder had resin molecular weights of about 8.6 and about 2.5 kDa ($M_w$ and $M_n$) at an age of about 6 days and molecular weights of about 8.8 and about 2.7 kDa ($M_w$ and $M_n$) at an age of about 21 days (differences between the molecular weights reported were within the accuracy of the GPC measurement technique).

Following aging, the granules were added to water to form a latex and the latex was left to dry so that the resin molecular weight could be again measured by GPC. The molecular weight of the resin in the dried latex was the same as that in the granules ($M_w$=8.4 and $M_n$=2.6 kDa) after 21 days of storage. Similar retention of polymer molecular weights in the granules were observed for the other examples. As evidenced by the data, the granules can be stored for long periods of time without adversely affecting the resin properties.

TABLE 1

Comparison of resin molecular weights prior to and following emulsification in batch and extruder processes using NaOH and piperazine.

| Experiment | Resin | Process | Neutralizing Agent | Molecular Weight (kg/mol) $M_w$ | $M_n$ | % Degraded on $M_w$ | on $M_n$ |
|---|---|---|---|---|---|---|---|
| Raw Material | crystalline | Raw Material | Not applicable | 21.9 | 10.2 | 0 | 0 |
| Comp. Ex. 1 | crystalline | Extruder | NaOH | 18.8 | 8.4 | 14 | 18 |
| Example 1 | crystalline | Extruder | Piperazine | 22.1 | 10.4 | 0 | 0 |
| Raw Material | amorphous | Raw Material | Not applicable | 18.6 | 4.6 | 0 | 0 |
| Comp. Ex. 2 | amorphous | Batch | NaOH | 9.6 | 2.5 | 48 | 46 |
| Example 2 | amorphous | Batch | Piperazine | 15.3 | 3.4 | 18 | 26 |

As can be seen in Table 1, replacing the stronger bases such as NaOH dissolved in water, with secondary amines of the present disclosure greatly reduces the degree of polyester resin degradation.

Example 3

Aggregation and coalescence process utilizing a solvent free crystalline latex neutralized by piperazine in lieu of a solvent based crystalline latex neutralized by NaOH to produce about 6 micron cyan polyester toner particle. About 529.2 grams of DIW, about 204.2 grams of poly(co-propoxylated bisphenol co-ethoxylated bisphenol co-terephtalate) amorphous polyester resin, about 41.6 grams of solvent-free crystalline polyester latex (about 6.8 wt %) prepared from granules in Example 1, about 2.26 grams of Dowfax 2A1 anionic surfactant, about 52.9 grams of Cyan pigment PB15:3 from Sun Chemical and about 46.2 grams of polyethylene wax from IGI were charged into a 2-liter plastic beaker. The slurry mixture was pH adjusted to about 4 with diluted nitric acid. Then the whole toner slurry was homogenized using a portable Turrex homogenizer probe at about 4000 to about 6000 rpm for about 10 minutes. A small amount of aluminum sulfate flocculent was also added during the homogenization process. The resulting thick toner slurry was charged into a 2 L Buchi stainless steel reactor installed with a mechanical agitator and equipped with a double impellor. The mixture was agitated at about 450 rpm for about 5 minutes.

Thereafter, the entire contents were heated to about 42° C. for the toner aggregation process. Particle growth and size was monitored with a Coulter Counter during the heat-up temperature ramp frequently. When the reactor temperature reached about 42° C., the toner particle growth was monitored closely until the particle size was approximately 5 microns. Then, about 112.9 grams of poly(co-propoxylated bisphenol co-ethoxylated bisphenol co-terephtalate) amorphous "shell" latex was added and the mixture was heated for about 30 minutes. The particle size was measured at about 5.8 to about 6 microns.

The toner particle growth process was then stopped by adding a small amount of a NaOH base solution to raise the toner slurry pH to above about 7 followed by a coalescence process at elevated temperatures above the Tg of the toner resins (from about 50° C. to about 95° C. The entire process starting from raw materials preparation, to homogenization, aggregation and coalescence, took approximately 7 to 8 hours for completion. When the desired toner particle size was obtained, the toner slurry was quenched and discharged from the 2-liter reactor.

The emulsion aggregation/coalescence process produced polyester toner particles of about 6.15 microns with a GSD of about 1.27, having smooth morphology and solids content of about 13%. The final solid particles were filtered, followed by screening and washing at room temperature prior to the drying process.

The resulting toner particles performed similar to the nominal solvent based crystalline latex neutralized by NaOH in the aggregation and coalescence process with no particular process issue in terms of mixing, toner viscosity, toner particle growth and stability in the toner freezing step. The final toner particle size, GSD and toner shape (circularity) were similar for both toners as shown in Table 2 herein below.

TABLE 2

Toner properties for nominal toner particles and toner particles in accordance with the present disclosure with a solvent-free piperazine based crystalline latex.

| Sample I.D. | Toner Particle Size (μm) | GSD | Toner Circularity |
|---|---|---|---|
| Nominal EA toner | 5.84 | 1.31 | 0.96 |
| Piperazine based EA toner | 6.15 | 1.27 | 0.93 |

Accordingly, the use of piperazine as a neutralizing agent had no affect on the toner making process or toner characteristics.

Charging Performance

Charging performance of a piperazine containing toner produced as in Example 2. Charging characteristics were determined by testing developers made by combining about 0.5 grams of toner with about 10 grams of xerographic carrier (65 micron steel core, Hoeganaes Corporation) coated with about 1% by weight of polymethylmethacrylate. The developers were placed in a glass jar and mixed using a paint shaker at about 715 cycles per minute.

The samples were kept in their respective environments overnight to fully equilibrate. The following day, the developer was charged by agitating the samples for about one hour in a Turbula mixer. The charge on the toner particles was measured using a charge spectrograph (CSG). The results are set forth in FIG. 3, which includes plots comparing the charging of the toners of the present disclosure, the toner of Example 1 (solvent free polyester piperazine based toner) with comparative toners A (solvent based polyester resin toner by phase inversion emulsification (PIE) at a production scale) and B (solvent based polyester resin toner by phase inversion emulsification (PIE) at a laboratory scale) and the toner of Comparative Example 1 (solvent-free polyester NaOH based toner). Low-humidity tests (C-Z) were done at about 10° C. and about 15% RH, while the high humidity tests (A-Z) were done at about 28° C. and about 85% RH.

Figure 3:
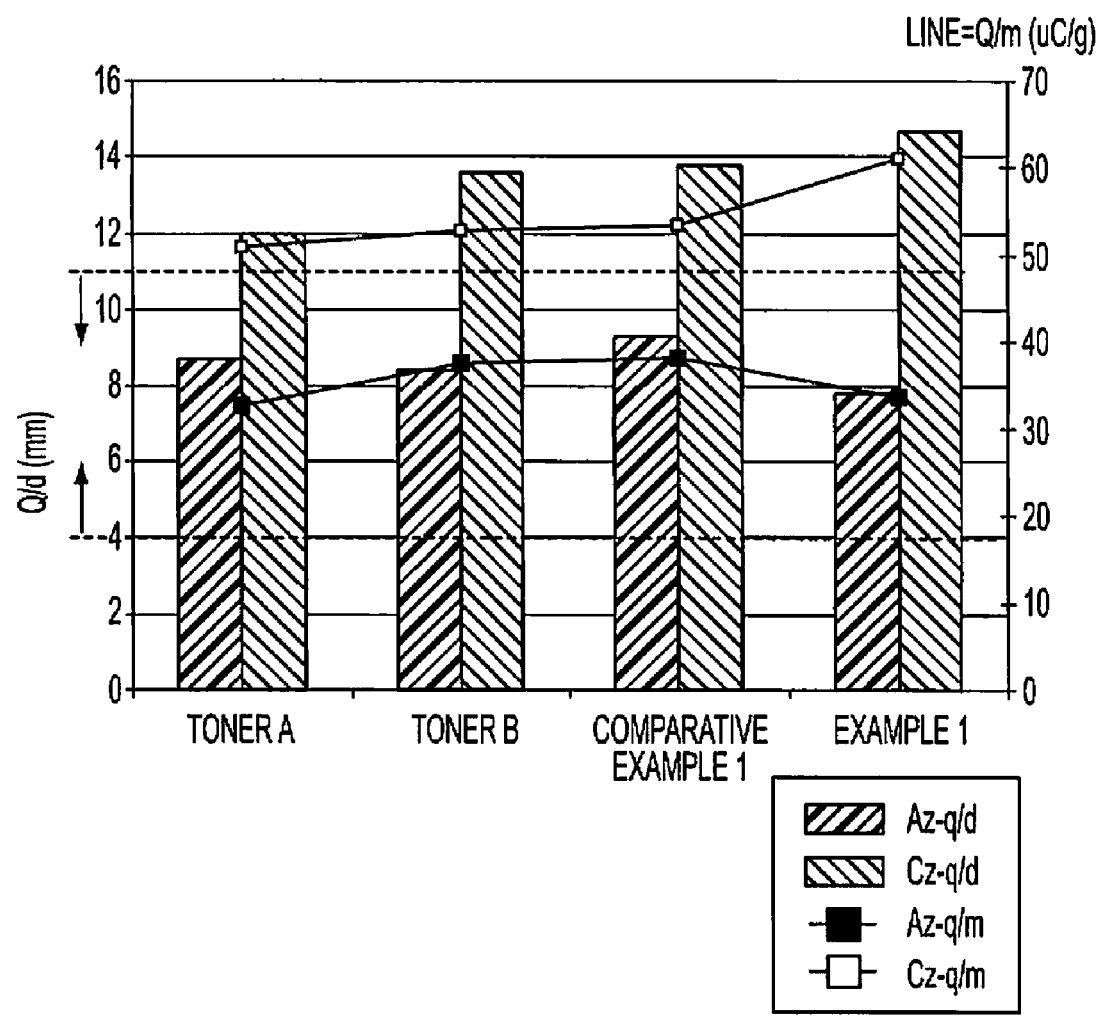
FIG. 3 is a graph comparing the charging (in both A-zone and C-zone) of toners of the present disclosure with control and comparative toners.

The toner charge was calculated as the midpoint of the toner charge trace from the CSG. Charge/distance (Q/d) was reported in millimeters (mm) of displacement from the zero line or can be converted to μC/micron by multiplying the value in mm by 0.092. The corresponding charge/mass (Q/m) in μC/grams was also measured and included. FIG. 3 shows a plot of Q/d for the piperazine based toner compared to the baseline solvent based toners. As can be observed, charging performance was not affected by the use of piperazine as a neutralizing agent in lieu of NaOH for the solvent-free toners or $NH_4OH$ for the solvent based toners.

As illustrated in FIG. 3, the toner of Example 1 of the present disclosure was quite similar to the comparative toners including a solvent based process for preferred gloss performance. Under high humidity and high temperature conditions (A-Z) that disfavor triboelectrification of the toner against the carrier, the toner of Example 1 showed essentially the same charge as the comparative toners. Under low humidity and low temperature conditions (C-Z) that favor triboelectrification, the toner of Example 1 showed slightly greater charge and less charge movement over time than the comparative toners. Thus, from the standpoint of triboelectrification, toners of the present disclosure with solvent free piperazine based polyester resins provided equivalent performance to nominal toners and improved charging versus a comparative toner made with a solvent based system that was known to give improved developer aging properties.

Toner Flow

It is desirable to have a toner with low cohesion to enable effective toner flow. Inventive and comparative toners were tested in a Hosokawa Powder Flow Tester by using a set of 53 (A), 45 (B) and 38 (C) micron screens stacked together, with the weight of the screens recorded before adding to the top screen about 2 grams of toner weighted into an open dish and conditioned in an environmental chamber at a specified temperature and 50% relative humidity. The vibration time of the Hosokawa Powder Flow Tester was set to about 90 seconds at about 1 mm vibration. After about 17 hours, the samples were removed and acclimated in ambient conditions for about 30 minutes. Each re-acclimated sample was measured by sieving through a stack of two pre-weighed mesh sieves, which are stacked as follows: 1000 μm on top and 106 μm on bottom.

After vibration, the screens were removed and weighed to determine the weight of toner (weight after–weight before=weight retained toner). Percent Cohesion was calculated by the following formula:

$$\% \text{ Cohesion} = (R_1/T_i) \times 100\% + (R_2/T_i) \times 60\% + (R_3/T_i) \times 20\%$$

wherein $R_1$, $R_2$ and $R_3$ were the amounts of toner retained in screens A, B and C, respectively, and $T_i$ was the initial amount of toner. Other samples were prepared and measured using varying chamber temperature to generate a plot of % heat cohesion with temperature. The results are set forth in FIG. 4. The onset of heat cohesion was found at the intersection of the baseline flow and cohesion line.

Figure 4:
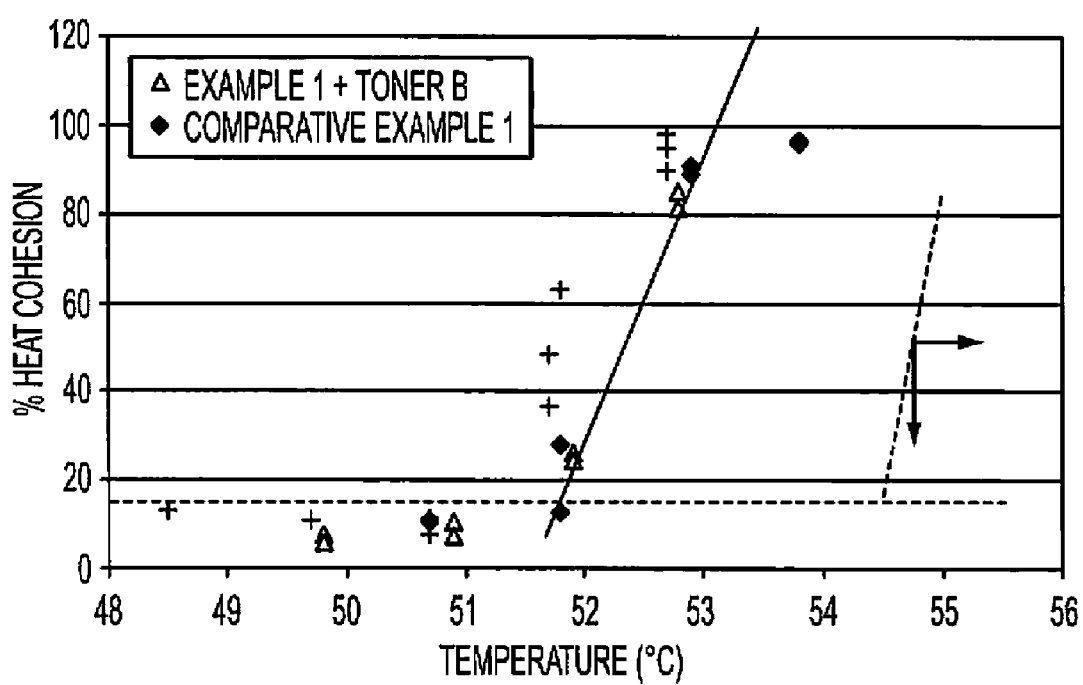
FIG. 4 is a graph comparing the flow properties and cohesion of a toner of the present disclosure and comparative toners.

As is seen in FIG. 4, it was observed that the production of a solvent free piperazine based polyester resin toner as described above in Examples 1 and 3 provided a desirable toner with low cohesion, i.e. decreased particle to particle cohesion. For example, the toner of Example 1 was much less cohesive than comparative Toner B (solvent based polyester toner by EA) and the toner of Comparative Example 1. That is, the toner flow properties of toners of the present disclosure were superior to the prior art toner.

Gloss

Figure 5:
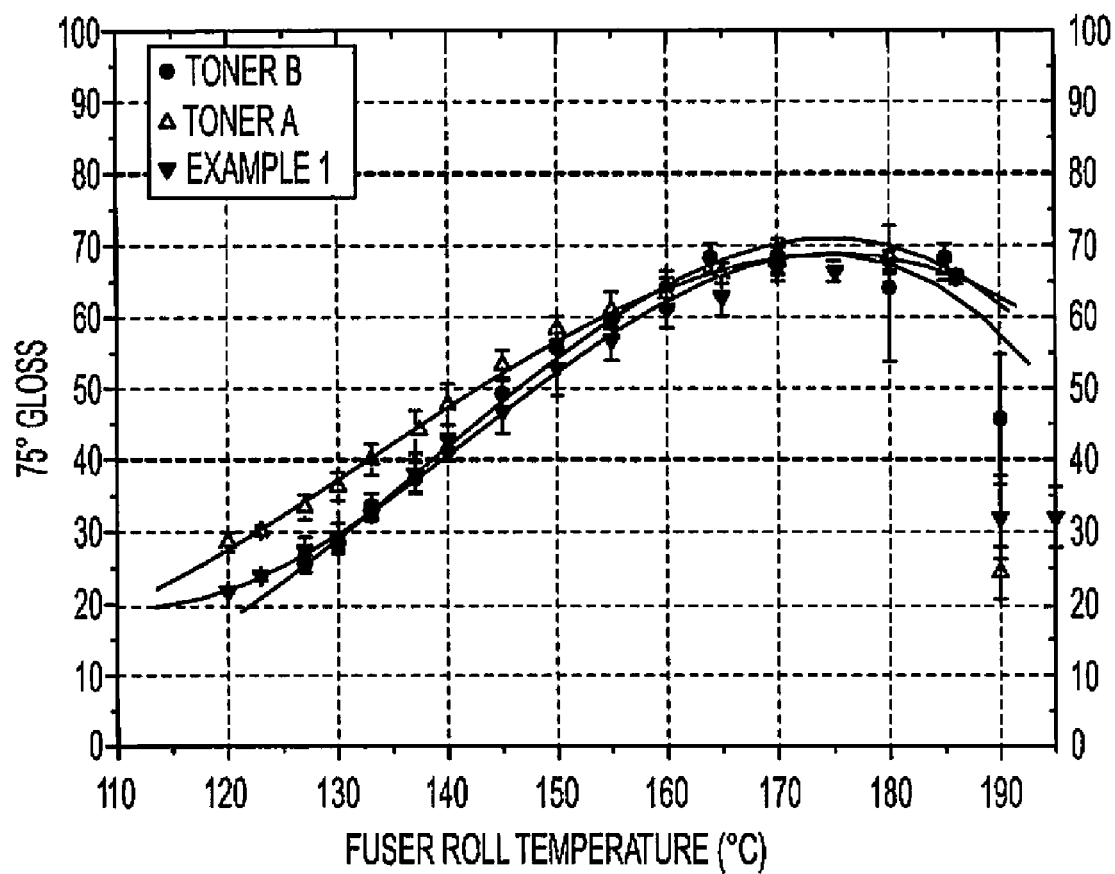
FIG. 5 is a graph depicting gloss values obtained for a toner of the present disclosure produced in the Examples compared with a comparative toner and a control toner.

The fusing performance of test samples was evaluated using a Patriot (FBNF—free belt nip fuser) off-line fusing fixture. A set of unfused images was first generated using a modified DC12 (fuser lamps removed). These images had a toner mass per unit area (TMA) of about 1.05 mg/cm2 on the ColorXpressions+90 gsm uncoated paper substrate (from Xerox). Test images were then run through the offline Patriot fusing fixture at about 220 mm/second process speed over a range of fuser roll temperatures. As shown in FIG. 5, print gloss (Gardner gloss units or "ggu") was measured using a 75° BYK Gardner gloss meter for toner images that were fused at a fixed toner per unit area on Xerox Digital Color Elite Gloss paper.

As is seen in FIG. 5, gloss was plotted as a function of fuser roll temperature for the toner of Example 1, comparative Toner A and comparative Toner B (solvent based polyester toner by EA). Gloss curves for the toner of Example 1 and Toner B (solvent based polyester toner by EA) were within experimental uncertainty of each other. A small shift in gloss to lower fuser roll temperatures was measured for Toner A (solvent based polyester resin toner by PIE) and was likely due to differences in cooling rates.

Figure 6:
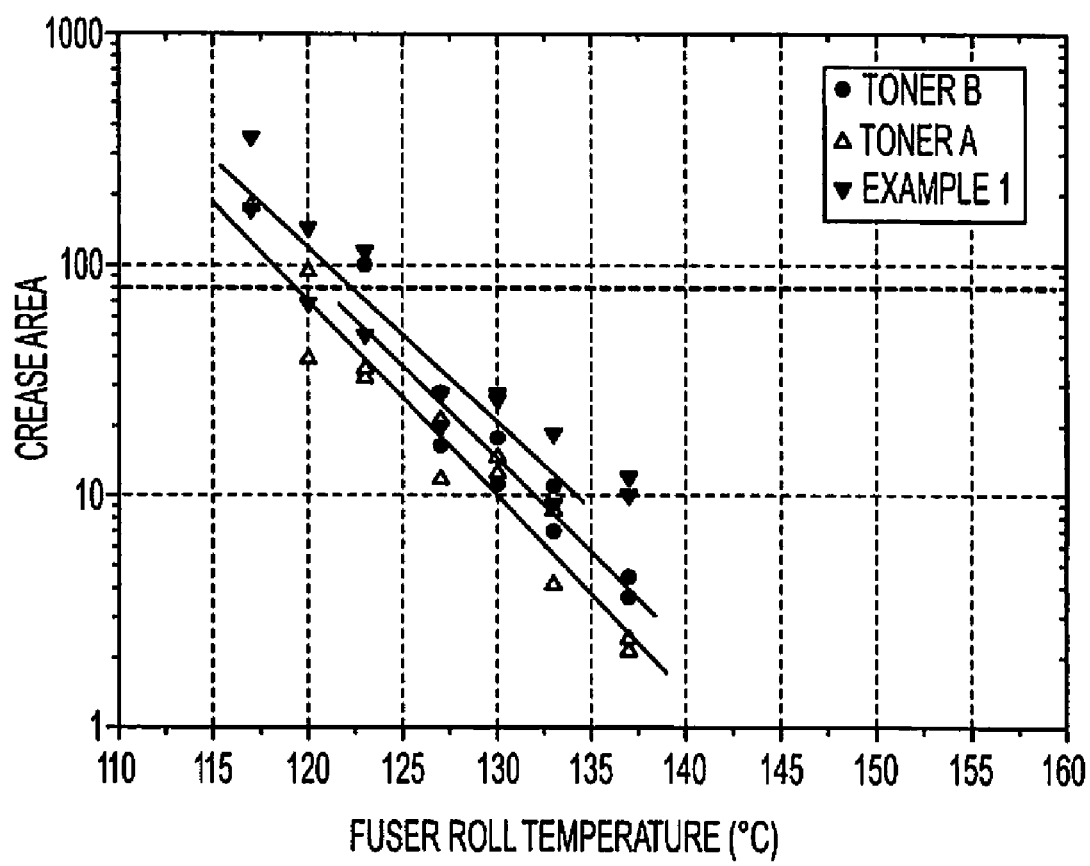
FIG. 6 is a graph depicting crease area obtained for a toner of the present disclosure produced in the Examples compared with a comparative toner and a control toner.

The adhesion of toner to paper was then measured by the standard crease area measurement as shown in FIG. 6 for the same three sample toners. Crease area minimum fusing temperatures were from about 120° C. to about 123° C., which was well within experimental uncertainty of each other.

As can be observed from the fusing and crease performance plots using a crystalline latex derived from a solvent-free process neutralized by piperazine instead of a solvent based crystalline latex neutralized by $NH_4OH$ did not impact fusing performance.

Thus, to summarize, toners of the present disclosure enabled effective gloss control, provided excellent triboelectrification properties, while also giving preferred toner flow and adhesion characteristics relative to comparative toners having solvent based crystalline latexes neutralized by $NH_4OH$. Interestingly, it was found that the gloss could be effectively controlled without any deleterious impact on charging levels. It was also found that the polyester resin derived from a solvent free process neutralized by piperazine provided both improved or similar cohesion and adhesion performance of the inventive toners without the need to use water to dissolve the neutralizing agent for the same purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A self-emulsifiable granule comprising:
   at least one polyester resin in the absence of an organic solvent and water;
   a highly concentrated surfactant; and
   a solid neutralizing agent selected from the group consisting of monocyclic compounds containing one or more nitrogen atoms, polycyclic compounds containing one or more nitrogen atoms, and combinations thereof; and
   wherein the self-emulsifiable granule forms a latex emulsion upon contact with water.

2. The self-emulsifiable granule according to claim 1, wherein the at least one polyester resin is selected from the group consisting of amorphous resins, crystalline resins, and combinations thereof.

3. The self-emulsifiable granule according to claim 1, wherein the latex emulsion is formed by the addition of water at a temperature of from about 50° C. to about 100° C.

4. The self-emulsifiable granule according to claim 1, wherein the surfactant is selected from the group consisting of anionic surfactants, ionic surfactants, nonionic surfactants, cationic surfactants, and combinations thereof.

5. The self-emulsifiable granule according to claim 1, wherein the neutralizing agent is selected from the group consisting of aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

6. The self-emulsifiable granule according to claim 1, wherein the self-emulsifying granules are from about 0.5 cm to about 2 cm in diameter.

7. The self emulsifiable granule according to claim 1, wherein the polyester resin has a number average molecular weight of from about 1,000 to about 50,000, a weight average molecular weight of from about 2,000 to about 100,000, and a molecular weight distribution of from about 2 to about 6.

8. A process comprising:
   contacting a polyester resin with a highly concentrated surfactant, and a solid neutralizing agent selected from the group consisting of monocyclic compounds containing one or more nitrogen atoms, polycyclic compounds containing one or more nitrogen atoms, and combinations thereof, in the absence of water and an organic solvent to form a mixture;
   melt mixing the mixture;
   forming a self-emulsifying composite of the melt mixed mixture;
   solidifying the self-emulsifying composite; and
   forming the self-emulsifying composite into a granule.

9. The process according to claim 8, further comprising:
   adding water to the self-emulsifying composite to provide a latex emulsion containing latex particles; and
   continuously recovering the latex particles.

10. The process according to claim 8, wherein the resin comprises a polyester resin selected from the group consisting of amorphous resins, crystalline resins, and combinations thereof.

11. The process according to claim 10, wherein the resin is a mixture of amorphous resins and crystalline resins and the melt mixing is performed at a temperature above the glass transition temperature of the mixture.

12. The process according to claim 8, wherein melt mixing occurs at temperatures of from about 30° C. to about 300° C. and a rate of from about 10 rpm to about 5,000 rpm, and wherein adding the water occurs at temperatures of from about 40° C. to about 110° C.

13. The process according to claim 8, wherein the polyester resin is a resin having a number average molecular weight of from about 1,000 to about 50,000, a weight average molecular weight of from about 2,000 to about 100,000, and a molecular weight distribution of from about 2 to about 6.

14. The process according to claim 8, wherein the solid neutralizing agent is selected from the group consisting of aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

15. The process according to claim 8, wherein the highly concentrated surfactant is a solid selected from the group consisting of anionic surfactants, ionic surfactants, nonionic surfactants, cationic surfactants, and combinations thereof, and the surfactant is present in an amount from about 0.01% to about 20% by weight of the resin.

16. A process for preparing a polyester toner comprising:
contacting a crystalline polyester resin with a highly concentrated surfactant, and a solid neutralizing agent selected from the group consisting of monocyclic compounds containing one or more nitrogen atoms, polycyclic compounds containing one or more nitrogen atoms, and combinations thereof, in the absence of water and an organic solvent to form a mixture;
melt mixing the mixture;
forming a self-emulsifying composite of the melt mixed mixture;
solidifying the self-emulsifying composite;
forming the self-emulsifying composite into a granule;
adding water to the self-emulsifying composite when desired to form a latex emulsion; and
optionally adding one or more additional ingredients of a toner composition to the resin.

17. The process according to claim 16, wherein melt mixing occurs at a temperature of from about 50° C. to about 200° C. and at a rate of from about 20 rpm to about 2,000 rpm, and wherein adding the water occurs at a temperature of from about 50° C. to about 100° C.

18. The process according to claim 16, wherein the polyester resin has a number average molecular weight of from about 1,000 to about 50,000, a weight average molecular weight of from about 2,000 to about 100,000, and a molecular weight distribution of from about 2 to about 6.

19. The process according to claim 16, wherein the solid neutralizing agent is selected from the group consisting of aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof, and wherein the addition of the neutralizing agent raises the pH of the emulsion of resin particles to from about 6 to about 11.

20. The process according to claim 16, wherein the surfactant is selected from the group consisting of anionic surfactants, ionic surfactants, nonionic surfactants, cationic surfactants, and combinations thereof, and the surfactant is present in an amount from about 0.1% to about 10% by weight of the resin.

* * * * *